United States Patent
Bonnet et al.

(10) Patent No.: US 7,174,718 B2
(45) Date of Patent: Feb. 13, 2007

(54) DEVICE FOR CONTROLLING PROPULSIVE JET MIXING FOR AIRCRAFT JET ENGINES

(75) Inventors: Jean-Paul Bonnet, Poitiers (FR); Joel Delville, Poitiers (FR); Erwan Collin, Lavoux (FR); Jean Tensi, Poitiers (FR); Eric Moreau, Saint-Benoit (FR); Gerard Touchard, Mignaloux Beauvoir (FR)

(73) Assignee: Centre National de la Recherche Scientifique-CNRS (FR)

( * ) Notice: Subject to any disclaimer, the term of this patent is extended or adjusted under 35 U.S.C. 154(b) by 0 days.

(21) Appl. No.: 10/801,265

(22) Filed: Mar. 16, 2004

(65) Prior Publication Data
US 2004/0216446 A1 Nov. 4, 2004

Related U.S. Application Data

(63) Continuation of application No. PCT/FR02/03212, filed on Sep. 19, 2002.

(30) Foreign Application Priority Data
Sep. 19, 2001 (FR) .................................. 01 12113

(51) Int. Cl.
F02K 1/00 (2006.01)
(52) U.S. Cl. ...................... 60/770; 239/265.19; 60/228
(58) Field of Classification Search .......... 60/228–230, 60/232, 262, 263, 770, 226.1, 231; 239/265.13, 239/265.17, 265.19, 265.23; 181/213, 220
See application file for complete search history.

(56) References Cited

U.S. PATENT DOCUMENTS

| | | | |
|---|---|---|---|
| 2,763,125 A | | 9/1956 | Kadosch et al. |
| 3,095,163 A | | 6/1963 | Hill |
| 3,467,312 A | * | 9/1969 | Mehr ...................... 239/127.3 |
| 3,598,318 A | * | 8/1971 | Schiel .................... 239/265.13 |
| 3,598,319 A | * | 8/1971 | Howald et al. ......... 239/265.19 |
| 4,043,121 A | * | 8/1977 | Thomas et al. ............... 60/204 |

(Continued)

FOREIGN PATENT DOCUMENTS

DE 1 025 731 3/1958

(Continued)

OTHER PUBLICATIONS

Maher Benchiekh et al., *Contrôle par jet pulsé de l'écoulement dans un divergent court á grand angle*, C.R. Acad. Sci., Paris, vol. 328, No. 10, Oct. 2000, p. 749-756.

(Continued)

*Primary Examiner*—William H. Rodriguez
(74) *Attorney, Agent, or Firm*—DLA Piper US LLP (57) ABSTRACT

A device for controlling propulsive gas mixing at an outlet of an aircraft jet engine, wherein propulsive jets are composed of a hot primary jet exiting from a nozzle of the jet engine and a secondary flux flowing between an external wall of the nozzle and an internal wall of the jet engine including a divergent trailing edge on the wall that generates conditions of a separation of the primary jet close to an existence limit value and a primary jet controller that enables control of passage of the primary jet from a separated state to a reattached state, and vice versa.

15 Claims, 8 Drawing Sheets

U.S. PATENT DOCUMENTS

| | | | |
|---|---|---|---|
| 4,043,508 A * | 8/1977 | Speir et al. | 239/265.19 |
| 4,050,242 A * | 9/1977 | Dusa | 60/204 |
| 4,080,785 A * | 3/1978 | Koff et al. | 60/226.3 |
| 4,294,068 A * | 10/1981 | Klees | 60/204 |
| 4,357,796 A * | 11/1982 | Ellis | 60/262 |
| 4,592,201 A * | 6/1986 | Dusa et al. | 60/262 |
| 4,696,159 A * | 9/1987 | Horgan | 60/226.1 |
| 5,154,052 A * | 10/1992 | Giffin et al. | 60/262 |
| 5,184,459 A * | 2/1993 | McAndrews | 60/226.3 |
| 5,222,359 A * | 6/1993 | Klees et al. | 60/204 |
| 5,261,227 A * | 11/1993 | Giffin, III | 60/226.1 |
| 5,435,127 A * | 7/1995 | Luffy et al. | 60/204 |
| 5,752,381 A | 5/1998 | Speller | |
| 5,758,823 A | 6/1998 | Glezer et al. | |
| 5,957,413 A | 9/1999 | Glezer et al. | |
| 6,112,513 A | 9/2000 | Catt et al. | |
| 6,308,898 B1 * | 10/2001 | Dorris et al. | 239/265.17 |
| 6,314,721 B1 * | 11/2001 | Mathews et al. | 60/264 |
| 6,360,528 B1 * | 3/2002 | Brausch et al. | 60/262 |
| 6,487,848 B2 * | 12/2002 | Zysman et al. | 60/262 |
| 6,502,383 B1 * | 1/2003 | Janardan et al. | 60/226.1 |
| 6,532,729 B2 * | 3/2003 | Martens | 60/204 |
| 6,658,839 B2 * | 12/2003 | Hebert | 60/204 |
| 6,718,752 B2 * | 4/2004 | Nesbitt et al. | 60/204 |
| 6,735,936 B2 * | 5/2004 | Rey et al. | 60/226.3 |
| 6,786,038 B2 * | 9/2004 | Lair | 60/226.1 |
| 6,813,877 B2 * | 11/2004 | Birch et al. | 60/226.1 |
| 2002/0125340 A1 * | 9/2002 | Birch et al. | 239/265.11 |
| 2004/0187474 A1 * | 9/2004 | Martens et al. | 60/204 |
| 2004/0237501 A1 * | 12/2004 | Brice et al. | 60/204 |

FOREIGN PATENT DOCUMENTS

FR      2 578 293      9/1986

OTHER PUBLICATIONS

Luc Léger et al., *Influence of a DC corona discharge on the airflow along an inclined flat plate*, Journal of Electrostatics, Elsevier Science B.V., Amsterdam, NL, vol. 51-52, May 2001, p. 300-306.

* cited by examiner

DEVICE FOR CONTROLLING PROPULSIVE JET MIXING FOR AIRCRAFT JET ENGINES

RELATED APPLICATION

This is a continuation of International Application No. PCT/FR02/03212, with an international filing date of Sep. 19, 2002 (WO 03/025377, published Mar. 27, 2003), which is based on French Patent Application No. 01/12113, filed Sep. 19, 2001.

FIELD OF THE INVENTION

This invention pertains to the field of aircraft jet engines, especially devices for reducing noise generated by jet engines of civil transport aircraft, vectorization in the case of military aircraft or an increase in lift in the case of civil transport aircraft, as well as a decrease in the infrared signature for military aircraft.

BACKGROUND

Noise generated by an aircraft when taking off stems principally from its jet engine and the "jet" flowing out of it. This is particularly true for aircraft whose jet engines do not have very high dilution levels, as is notably the case with supersonic transport aircraft. In the case of military aircraft, vectorization is sought to augment the lateral or vertical efforts. Augmentation of lift in civil transport can also be envisaged to reduce, e.g., take-off distances.

Known in the prior art are passive methods consisting of a modification of the geometry of the lip of the jet to be manipulated. These devices, such as lobe mixers and miniature flaps, are nevertheless very difficult to add to and remove from a variable cycle engine.

Among the active mixing control methods suitable for supersonic jets, there are pneumatic or mechanical actuators. However, since the region of maximal receptivity is located at the discharge lip of the jet, the characteristic scales of flow are therefore very small and at very high frequencies. These constraints, added to the fact that the area involved is difficult to access in the case of commercial aircraft jet engines, make such jet control devices poorly suitable for in situ installation.

Also known in the prior art is a nozzle cut in a zigzag manner which is intended to mix the hot flux and the cold flux to reduce noise. Although such a system has the advantage of not increasing the weight of the engine, it nevertheless has the drawback of not adapting to different operating regimes or modes (vectorization, infrared signature, noise).

It would therefore be advantageous to resolve these drawbacks of the prior art by providing a device for controlling thee mixing of the jets by controlling separation of the primary jet generated by abrupt divergence of the walls of the nozzle, thereby using control of the separations as a method for excitation of the mixing layers.

SUMMARY

We disclose a device for controlling propulsive gas mixing at an outlet of an aircraft jet engine, wherein propulsive jets are composed of a hot primary jet exiting from a nozzle of the jet engine and a secondary flux flowing between an external wall of the nozzle and an internal wall of the jet engine including a divergent trailing edge on the wall that generates conditions of a separation of the primary jet close to an existence limit value and a primary jet controller that enables control of passage of the primary jet from a separated state to a reattached state, and vice versa.

We also disclose a device for controlling propulsive gas mixing at an outlet of an aircraft jet engine, wherein propulsive jets are composed of a hot primary jet exiting from a nozzle of the jet engine and a secondary flux flowing between an external wall of the nozzle and an internal wall of the jet engine comprising:

a divergent trailing edge on an internal wall of a nozzle and in a fixed position with respect to the internal wall of the nozzle, the divergent trailing edge diverging from a central axis extending along the jet engine and generating conditions of a minimal separation of the primary jet from the internal wall; and a primary jet controller fixed to the internal wall of the nozzle or an external wall of the nozzle relative to the primary jet that controls passage of the primary jet from a separated state to a reattached state, and vice versa.

We further disclose a device for controlling propulsive gas mixing at an outlet of an aircraft jet engine, wherein propulsive jets are composed of a hot primary jet exiting from a nozzle of the jet engine and a secondary flux flowing between an external wall of the nozzle and an internal wall of the jet engine comprising:

an immovable divergent trailing edge on an internal wall of the nozzle that diverges from a central axis extending through the jet engine and is fixed to the internal wall of the nozzle and generates conditions of a minimal separation of the primary jet from the internal wall; and a primary jet controller positioned at least partially on the divergent trailing edge and/or at least partially on the internal wall of the nozzle upstream of the divergent trailing edge that controls passage of the primary jet from a separated state to a reattached state, and vice versa.

BRIEF DESCRIPTION OF THE DRAWINGS

Better comprehension of the invention will be obtained from the description presented below for purely explanatory reasons of different modes of implementation of the invention with reference to the attached figures.

DETAILED DESCRIPTION

It will be appreciated that the following description is intended to refer to specific embodiments of the invention selected for illustration in the drawings and is not intended to define or limit the invention, other than in the appended claim.

This invention is remarkable in its broadest sense in that the wall of the nozzle has a divergent trailing edge to generate conditions of a separation of the primary jet close to an existence limit value and in that the device comprises means for controlling the separation of the primary jet, which make it possible to control the passage of the primary jet from a separation state to a reattachment state, and vice versa.

Controlling the separation of the primary jet is preferably periodic and, in a preferred embodiment, has a frequency between about 50 Hz and about 10 KHz. Controlling the separation of the primary jet is advantageously performed at the level of the trailing edge, with the trailing edge having an angle between about 10 and about 30° with the wall of the nozzle to generate a slight separation of the primary jet. Thus, by creating a succession of moments in which the flow is separated and those in which the flow is reattached, there is created a notable excitation of the jets immediately at the level of the trailing edge, region of maximal efficiency for this type of flow.

According to a first embodiment, the control means of the separation of the primary jet are constituted of at least one synthetic jet generated by the intermediary of a slit located in the wall of the nozzle and by a piezoelectric actuator positioned in a cavity located within the interior of the nozzle wall.

According to a second embodiment, the control means of the separation of the primary jet are constituted of at least one synthetic jet generated by a slit located in the wall of the nozzle and by a pressure generator positioned in a cavity located within the interior of the nozzle wall.

According to a third embodiment, the control means of the separation of the primary jet are constituted of at least one piezoelectric actuator arranged on the wall of the nozzle.

According to another embodiment, the control means of the separation of the primary jet are constituted of at least two electrodes arranged on the wall of the nozzle to create an electric discharge of the corona type and, thereby, overcome the thermomechanical constraints linked to the nature of the flow.

According to still another embodiment, the control means of the separation of the primary jet are constituted of at least one pressure generator arranged on the wall of the nozzle.

The use of electric controls thus makes it possible to avoid excessive weight of the jet engine. Another advantage is to be able to be associated with the onboard electronics and thereby to be able to control the control means of the separation of the primary jet, i.e., to activate or deactivate control of the separation of the primary jet or to adjust it according to the engine regime.

In the case of the last three embodiments mentioned above, the control means are arranged on either all or a part of the circumference of the internal wall of the nozzle, or on all or a part of the circumference of the external wall of the nozzle, or on all or a part of the circumference of the internal and external wall of the nozzle.

Controlling separation of the primary jet is advantageously performed in a manner to generate either a symmetrical flow or an antisymmetrical flow at the outlet of the jet engine. In this manner, for a symmetrical flow, controlling the separation of the primary jet takes place on the totality of the outlet surface of the jet, thereby enabling a reduction in noise and infrared signature. For an antisymmetrical flow, controlling the separation of the primary jet takes place on only a part of the surface of the jet outlet, thereby enabling effects on the directivity of the jet and the vectorization of the efforts.

The device according to the invention thus associates divergence of the trailing edge to create a natural separation of the primary jet exiting the nozzle and the means for the controlling of the separation of the primary jet.

In this configuration of the invention, the walls of the nozzle are relatively thick. The wall is advantageously configured to have an upstream convergence of the trailing edge to adapt the device to thin walls.

Turning now to the drawings, the invention pertains to a device for controlling mixing of propulsive jets (8, 9) at the outlet of an aircraft jet engine having a casing 100, the propulsive jets (8, 9) being composed of a hot primary jet (8) exiting from a nozzle (1) of the jet engine and a secondary flux (9) flowing between the external wall (2a) of the nozzle (1) and the internal wall of the jet engine.

Figure 1:
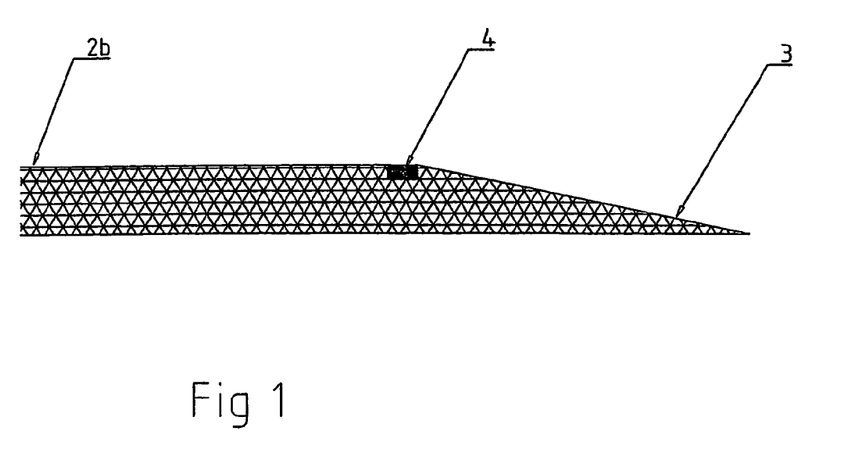
FIG. 1 is a partial sectional view of a nozzle equipped with the device according aspects of to the invention arranged on the internal wall of the nozzle upstream of the trailing edge.

The wall (2) of the nozzle (1) equipped with the device according to the invention, illustrated in FIG. 1, is constituted at its outlet with a trailing edge (3), which has an angle with the wall (2) of the nozzle (1) between about 10 and about 30° to generate a separation of the primary jet (8). Control means (4) of the separation of the primary jet (8), which are intended to control the passage of the primary jet (8) from a separated state to a reattached state, and vice versa, are arranged on the internal wall (2b) of said nozzle (1) at the level of the trailing edge (3) and, more particularly, upstream of the trailing edge (3).

According to a first embodiment, the control means (4) of the separation of the primary jet (8) is constituted of at least one piezoelectric actuator arranged on the internal wall (2b) of the nozzle (1). According to a second embodiment, the control means (4) of the separation of the primary jet (8) is constituted of at least one pressure generator arranged on the internal wall (2b) of the nozzle (1). According to a third embodiment, the control means (4) of the separation of the primary jet (8) is constituted of at least two electrodes (5) arranged on the internal wall (2b) of the nozzle (1) to create an electric discharge of the corona type.

According to another configuration of the invention (not shown), the control means (4) of the separation of the primary jet (8) (piezoelectric actuator, pressure generator or electrodes) can also be arranged on the trailing edge (3).

Figure 2:
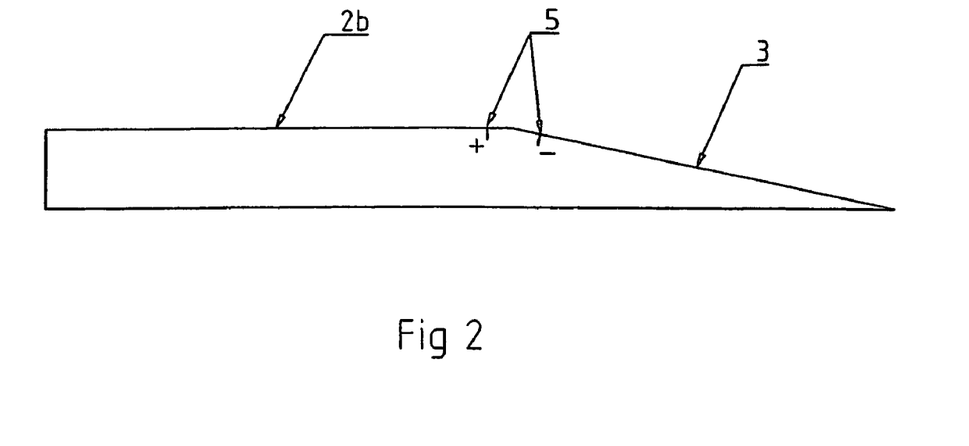
FIG. 2 is a partial sectional view of a nozzle equipped with a variant of the device constituted by electrodes arranged according to a first configuration.

According to another configuration, illustrated in FIG. 2, the control means (4) of the separation of the primary jet constituted by electrodes (5) can be arranged in the vicinity of the trailing edge (3) such that the positive electrode is positioned upstream of said trailing edge (3) and the negative electrode on the trailing edge (3), spaced apart from each other by about 1 to about 2 cm. Similarly, the negative electrode can be arranged at a distance corresponding to about one tenth of the diameter of the wall (2) of the nozzle (1) from the end of the trailing edge (3) corresponding to the outlet of the nozzle (1). The electrodes arranged in this manner make it possible to control the passage of the primary jet (8) from a separated state to a reattached state.

Figure 3:
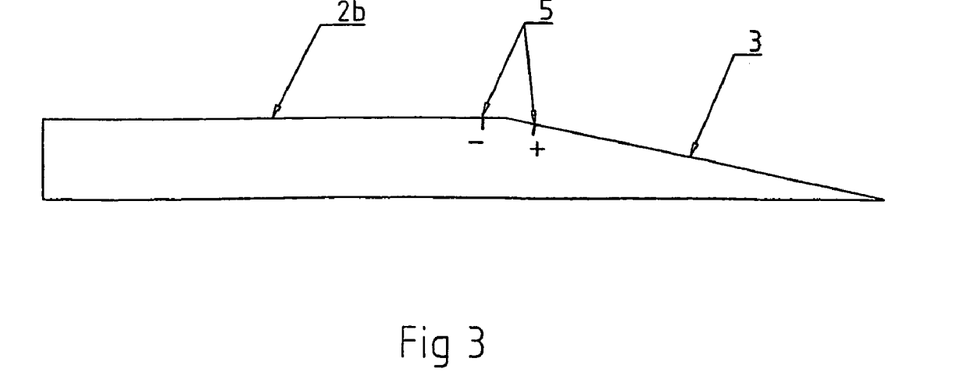
FIG. 3 is a partial sectional view of a nozzle equipped with a variant of the device constituted by electrodes arranged according to a second configuration.

Conversely, as illustrated in FIG. 3, the electrodes (8) can be arranged in the vicinity of the trailing edge (3) such that the negative electrode is placed upstream of the trailing edge (3) and the positive electrode on the trailing edge (3), spaced apart from each other by about 1 to about 2 cm. Similarly, the positive electrode can be placed at a distance corresponding to about one tenth of the diameter of the wall (2) of the nozzle (1) from the end of the trailing edge (3) corresponding to the outlet of the nozzle (1). The electrodes arranged in this manner can enable control of the passage of the primary jet (8) from an attached state to a separated state.

FIGS. 2 and 3 illustrate the placement, respectively, of the positive electrode and the negative electrode immediately upstream of the trailing edge (3). However, it is understood that any other positioning can be envisaged and, in particular, immediately downstream of the trailing edge (3).

Figure 4:
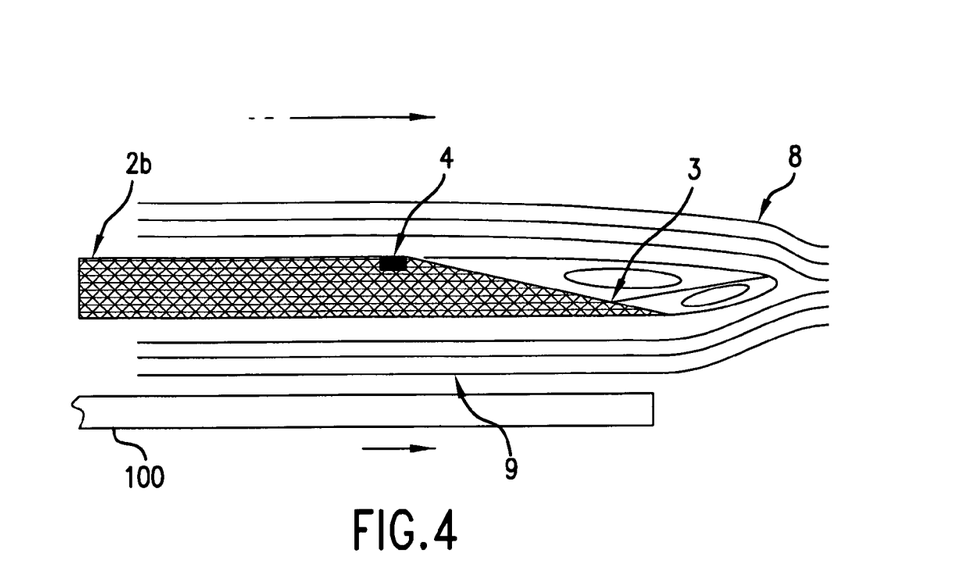
FIG. 4 is a schematic view of the flow of the primary jet when the control means of the separation of the primary jet are not activated (case of passage from a separated state to a reattached state)

FIG. 4 illustrates a schematic view of the flow of the primary jet (8) at the level of the trailing edge (3) of the nozzle (1) when the control means (4) of the separation of the primary jet (8) is not activated.

Figure 5:
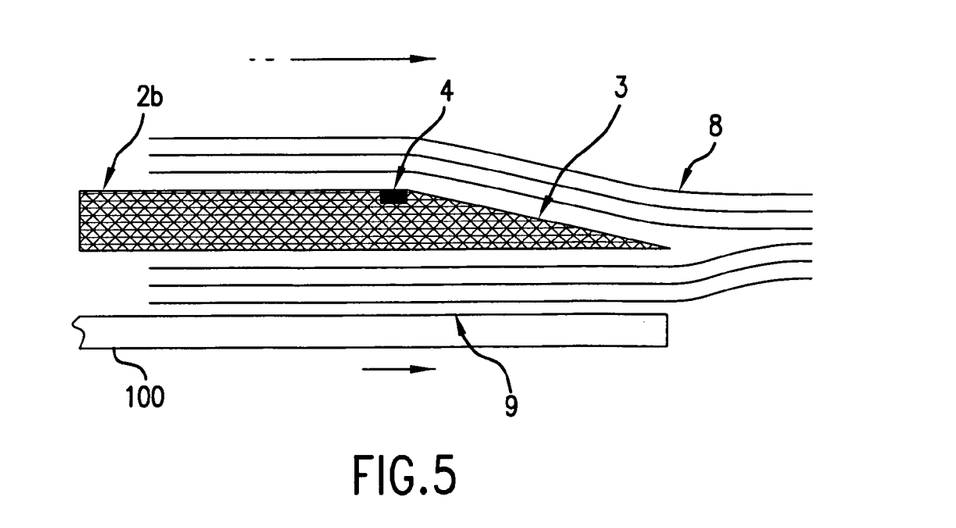
FIG. 5 is a schematic view of the flow of the primary jet when the control means of the separation of the primary jet are activated (case of passage from a separated state to a reattached state)

FIG. 5 illustrates a schematic view of the flow of the primary jet (8) at the level of the trailing edge (3) of the nozzle (1) when the control means (4) of the separation of the primary jet (8) is activated.

There is thus performed an excitation of the jets at the level of said trailing edge (3) upstream as illustrated in FIGS. 4 and 5, or on the trailing edge (3) (not shown) by alternating the moments in which the flow is separated and the moments when the flow is reattached, by periodic controlling of the separation of the primary jet (8). In a preferred mode of implementation, the separation control presents a frequency between about 50 Hz and about 10 KHz.

In another example (not shown), the control means (4) of the separation of the primary jet (8) can be constituted of at least one synthetic jet. The synthetic jet is then generated by the intermediary of a slit located in the wall (2) of the nozzle (1) as well as by a piezoelectric actuator or a pressure generator, which can be positioned in a cavity located in the interior of the wall (2) of the nozzle (1).

Figure 6:
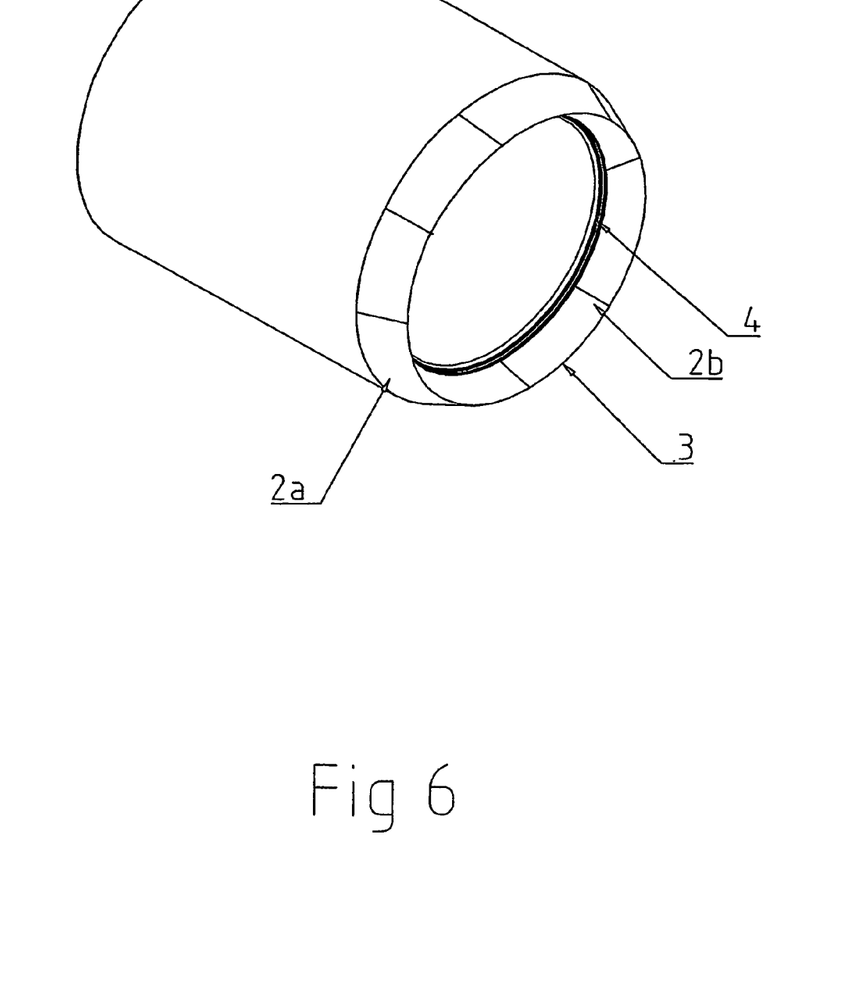
FIG. 6 is a perspective view of a nozzle equipped with the device according to the invention.

The example illustrated by FIGS. 4 and 6 pertains to passage of the primary jet (8) from a separated state to a reattached state, the separation of the primary jet (8) being generated naturally by the divergence of the wall (2) of the nozzle (1). FIG. 4 illustrates the control means (4) inactivated and FIG. 5 shows the control means (4) activated.

We will now turn to the case in which the primary jet (8) passes from an attached state to a separated state. Opposite to the preceding case, the control means (4) is activated to artificially separate the primary jet (8) close to the separation (FIG. 4) and inactivated to allow reattachment of the primary jet (8) on the wall (2) of the nozzle (1) (FIG. 5).

Figure 7:
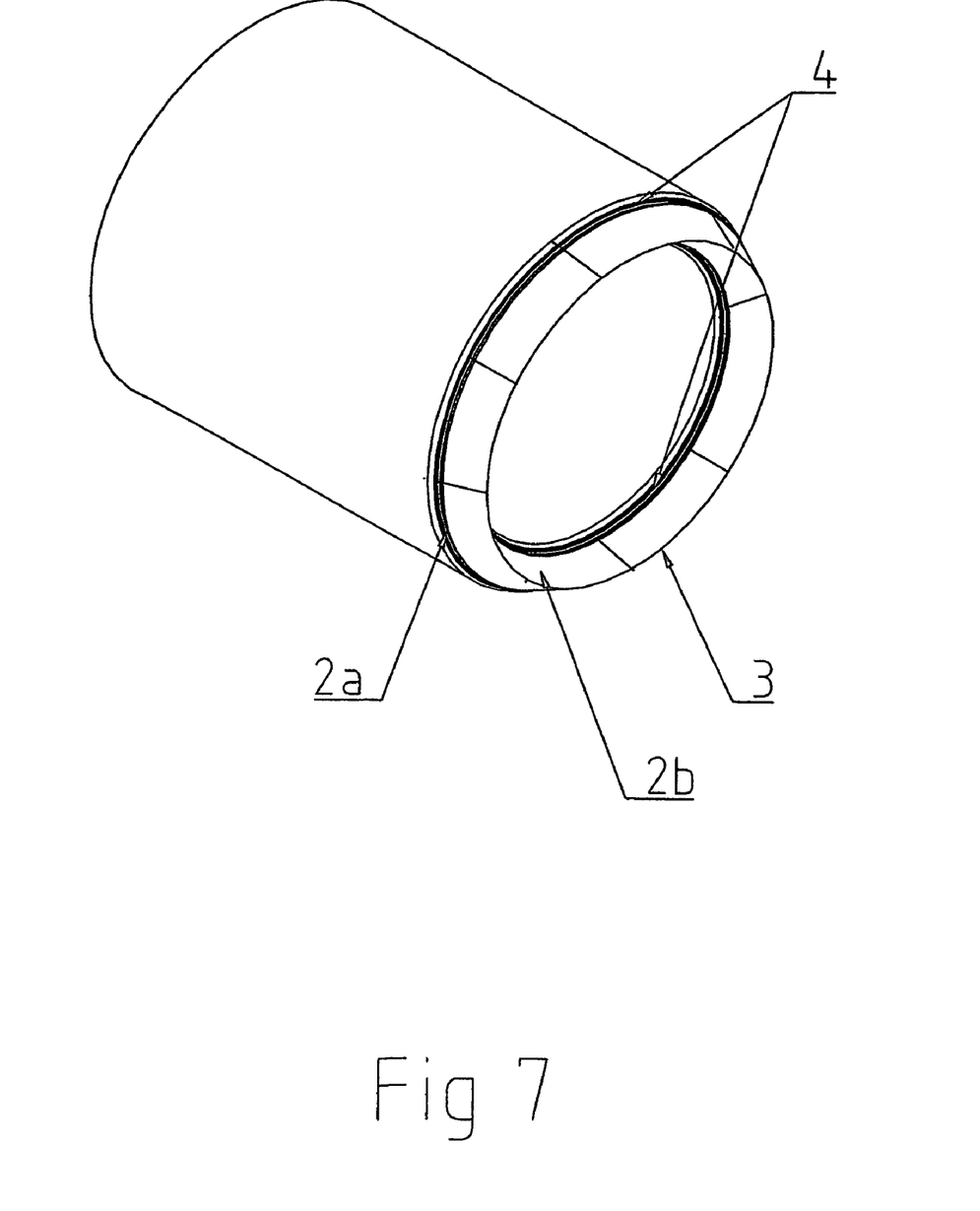
FIG. 7 is a perspective view of a nozzle equipped with a variant of the device according to the invention.

FIG. 6 illustrates a perspective view of a nozzle (1) equipped with a device according to aspects of the invention. The control means (4) of the separation of the primary jet (8) is arranged on the assembly of the internal wall (2b) of the nozzle (1). The control means (4) of the separation of the primary jet (8) can also be arranged on the internal wall (2b) and on the external wall (2a) of the nozzle (1) as illustrated in FIG. 7.

In another embodiment (not shown), the control means (4) of the separation of the primary jet can be arranged solely on the external wall (2a) of the nozzle. Thus, the reduction of the noise and the infrared signature can be achieved by controlling the separation of the primary jet (8) on the totality of the outlet surface of the primary jet (8). To have an effect on the directivity of the jet or the vectorization of the efforts, the control means (4) of the separation of the primary jet (8) can be actuated on only one sector of the outlet surface of the primary jet (8).

Figure 8:
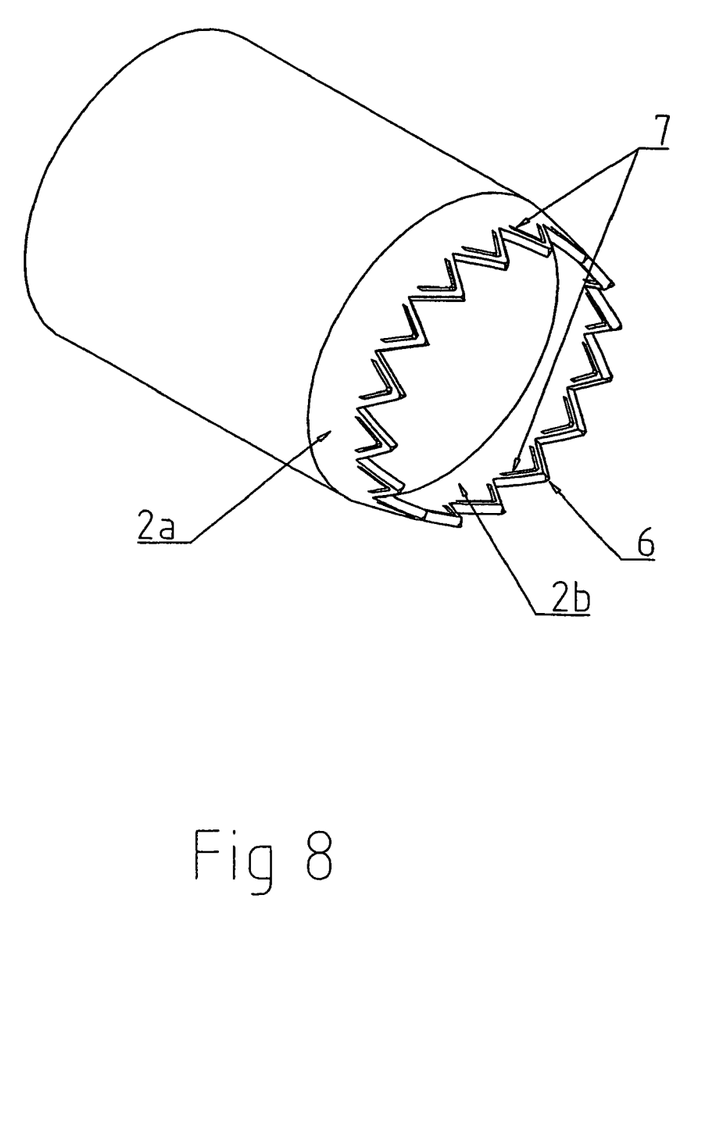
FIG. 8 illustrates the use of a nozzle cut in a zigzag manner.

FIG. 8 illustrates application of the device according to aspects of the invention on a nozzle cut in a zigzag manner. The control means (4), the same as those described in FIGS. 1 and 2, are arranged on the internal wall (2b) of the nozzle (1) close to each of the protrusions (7) forming the teeth (6) of the nozzle (1), and on the external wall (2a) of the nozzle (1) in the vicinity of each of the protrusions (7) forming the teeth (6) of the nozzle (1).

Figure 9:
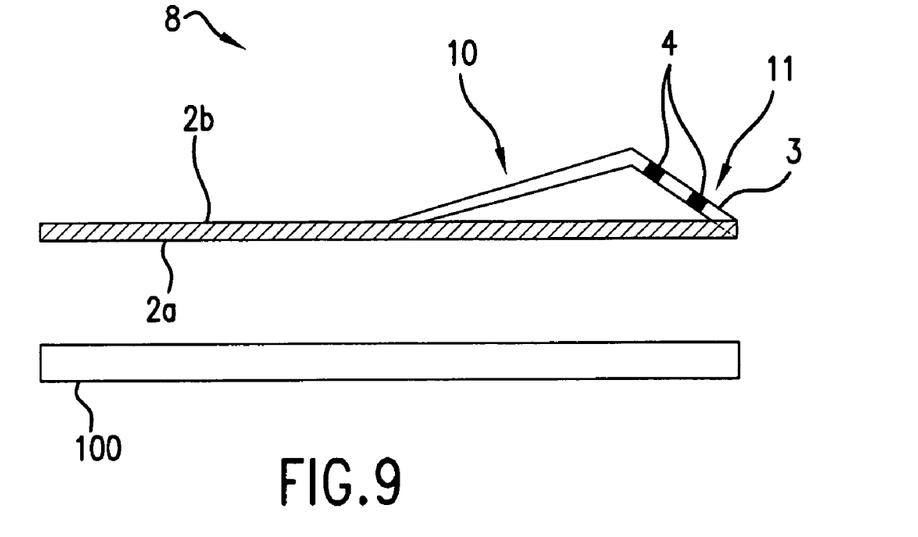
FIG. 9 is a partial sectional view of a thin-walled nozzle presenting a single-surface separation control.

FIG. 9 illustrates a partial sectional view of a thin-wall nozzle having a single-surface separation control. The internal wall (2b) of the nozzle (1) has a convergent part (10) and a divergent terminal part (11) to form a swelling at the outlet of said nozzle (1). The divergent part (11) constitutes the trailing edge (3). In this configuration, the control means (4) of the primary jet (8) is arranged on the divergent part (11) of the internal wall (2b) of the nozzle (1).

Figure 10:
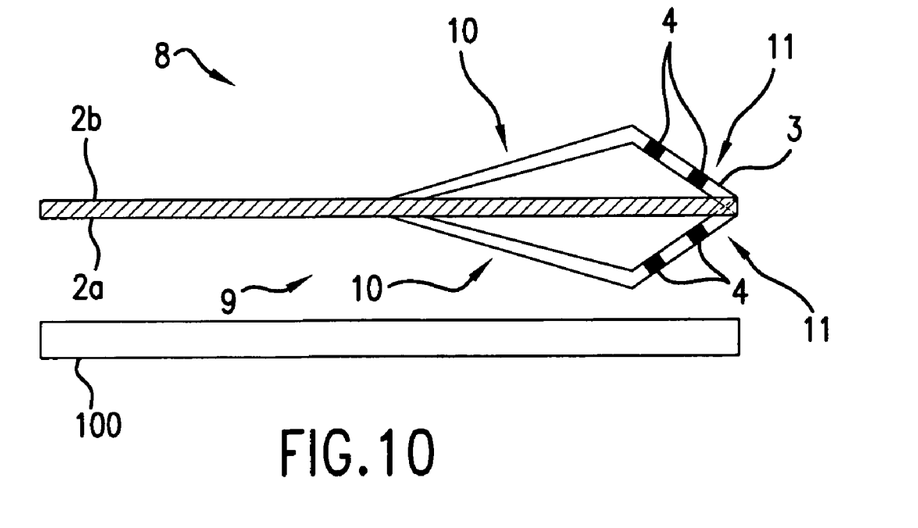
FIG. 10 is a partial sectional view of the nozzle of FIG. 9, having a dual-surface separation control.

FIG. 10 illustrates the thin-wall nozzle (1) of FIG. 9, the nozzle (1) being equipped with a dual-surface separation control. The internal wall (2b) and the external wall (2a) of the nozzle (1) have, respectively, in a symmetric manner a convergent part (10) and a divergent part (11). Thus, the divergent part (11) of the internal wall (2b) creates a natural separation of the primary jet (8) and the divergent part (10) of the eternal wall (2a) creates a natural separation of the secondary flux (9).

Reattachment of the primary jet (8) and the secondary flux (9) is implemented by the control means (4) arranged respectively on the divergent parts (11) of the internal wall (2b) and the external wall (2a) of said nozzle (1).

Figure 11:
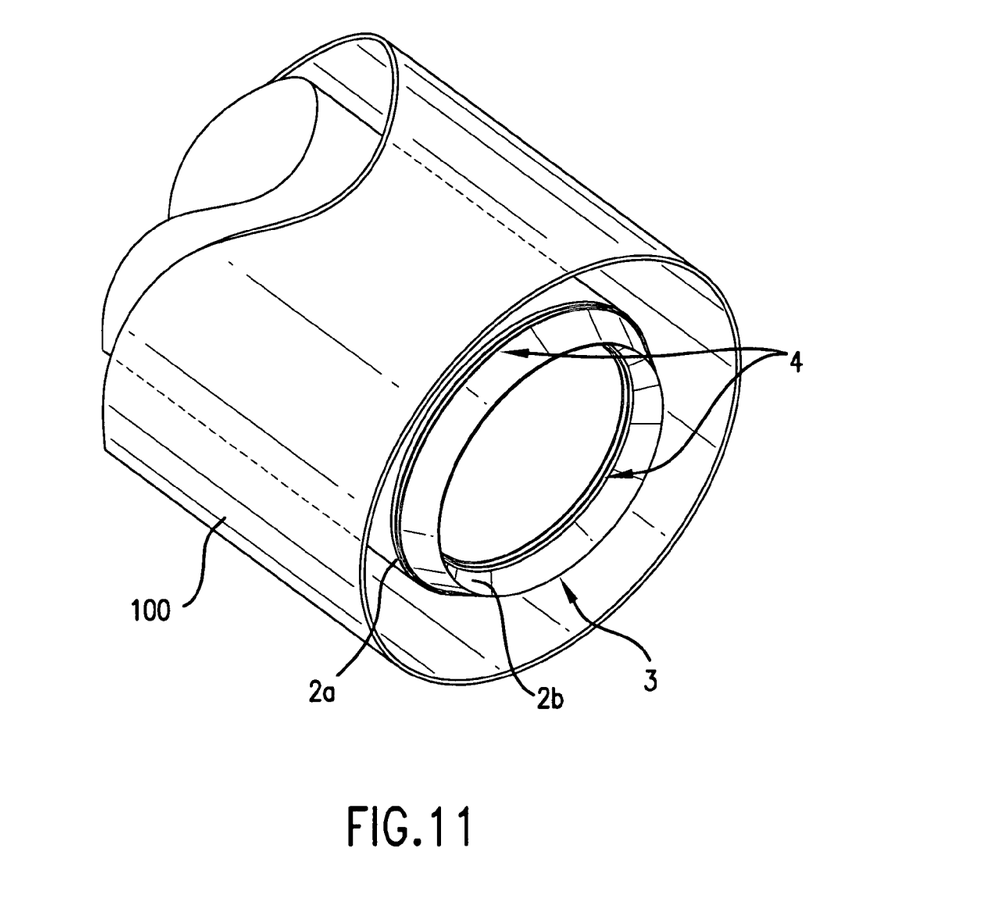
FIG. 11 is a schematic perspective view of a jet engine including a device for controlling propulsive gas mixing according to aspects of the invention.

FIG. 11 illustrates a jet engine comprising the device for controlling propulsive gas mixing in accordance with the invention. FIG. 11 shows an outer housing for the jet engine, the device itself and selected portions of the actual jet.

The invention was described above as an example. It is understood that one skilled in the art would be capable of implementing different variants of the invention without going beyond the framework of the patent.

The invention claimed is:

1. A device for controlling propulsive gas mixing at an outlet of an aircraft jet engine, wherein propulsive jets are composed of a hot primary jet exiting from a nozzle of the jet engine and a secondary flux flowing between an external wall of the nozzle and an internal wall of the jet engine comprising:

a divergent trailing edge on an internal wall of the nozzle and in a fixed position with respect to the internal wall of the nozzle, the divergent trailing edge diverging from a central axis extending along the jet engine and generating conditions of a minimal separation of the primary jet from the internal wall; and a primary jet controller fixed to the internal wall of the nozzle and/or an external wall of the nozzle relative to the primary jet that controls passage of the primary jet from a separated state to a reattached state, and vice versa.

2. The device according to claim 1, wherein controlling the separation of the primary jet is periodic in time and creates a succession of moments in which the flow is separated and those in which the flow is reattached.

3. The device according to claim 2, wherein control of the separation of the primary jet has a frequency between about 50 Hz and about 10 KHz.

4. The device according to claim 1, wherein the controller comprises at least one synthetic jet generated by an intermediary of a slot located in the internal wall of the nozzle and a piezoelectric actuator housed in a cavity located in the internal wall of the nozzle.

5. The device according to claim 1, wherein the controller comprises at least one synthetic jet generated by an intermediary of a slot located in the internal wall of the nozzle and a pressure generator housed in a cavity located in the internal wall of the nozzle.

6. The device according to claim 1, wherein the controller comprises at least one piezoelectric actuator arranged on the internal wall of the nozzle.

7. The device according to claim 1, wherein the controller comprises at least two electrodes arranged on the internal wall of the nozzle to create a corona effect electric discharge.

8. The device according to claim 1, wherein the controller comprises at least one pressure generator arranged on the internal wall of the nozzle.

9. The device according to claim 1, wherein the controller is arranged on all or a part of the circumference of the internal wall of the nozzle.

10. The device according to claim 1, wherein the controller is arranged on all or a part of the circumference of the external wall of said nozzle.

11. The device according to claim 1, wherein control of the separation of the primary jet is implemented at the divergent trailing edge corresponding to the end of the nozzle.

12. The device according to claim 1, wherein control of the separation of the primary jet is implemented to generate either a symmetrical flow or an antisymmetrical flow at the outlet of the jet engine.

13. The device according to claim 1, wherein the divergent trailing edge has an angle with the external wall of the nozzle between about 10 and about 30°.

14. The device according to claim 1, wherein the internal wall of the nozzle is convergent upstream of said divergent trailing edge.

15. A device for controlling propulsive gas mixing at an outlet of an aircraft jet engine, wherein propulsive jets are composed of a hot primary jet exiting from a nozzle of the jet engine and a secondary flux flowing between an external wall of the nozzle and an internal wall of the jet engine comprising:
    an immovable divergent trailing edge on an internal wall of the nozzle that diverges from a central axis extending through the jet engine and is fixed to the internal wall of the nozzle and generates conditions of a minimal separation of the primary jet from the internal wall; and
    a primary jet controller positioned at least partially on the divergent trailing edge and/or at least partially on the internal wall of the nozzle upstream of the divergent trailing edge that controls passage of the primary jet from a separated state to a reattached state, and vice versa.

\* \* \* \* \*